US006470455B1

(12) United States Patent
Cromer et al.

(10) Patent No.: US 6,470,455 B1
(45) Date of Patent: Oct. 22, 2002

(54) DATA PROCESSING SYSTEM AND METHOD FOR PROHIBITING ACCESS TO A SCSI BUS

(75) Inventors: Daryl Carvis Cromer; Howard Locker, both of Cary; David Rhoades, Apex; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,330

(22) Filed: Mar. 31, 1999

(51) Int. Cl.$^7$ .................. G06F 11/30; G06F 13/00; G06F 13/38
(52) U.S. Cl. .............. 713/202; 713/200; 713/201; 710/100; 710/101; 710/107; 710/108; 710/126
(58) Field of Search .................. 713/200, 201, 713/202; 710/100, 101, 107, 108, 126

(56) References Cited

U.S. PATENT DOCUMENTS

| 5,375,243 A | 12/1994 | Parzych et al. ............. 395/725 |
| 5,742,758 A | 4/1998 | Dunham et al. ............ 395/186 |

FOREIGN PATENT DOCUMENTS

JP 7-93241 4/1995

OTHER PUBLICATIONS

"Illegal Access History in Hard Disk Drive," IBM Technical Disclosure Bulletin, vol. 37, No. 11, Nov. 1994, p. 445.

Primary Examiner—Norman M. Wright
Assistant Examiner—Jenise Jackson
(74) Attorney, Agent, or Firm—Andrew J. Dillon

(57) ABSTRACT

A data processing system and method are disclosed for prohibiting access to a SCSI bus prior to a correct entry of an access password. The system includes a plurality of internal SCSI bus devices coupled to the SCSI bus. The system also includes an external SCSI connector for coupling external SCSI devices to the SCSI bus. The access password is established and stored within the system. The plurality of internal SCSI bus devices and the external devices are prohibited from accessing the SCSI bus prior to a correct entry of the access password. The SCSI bus includes a busy signal line. Prior to a correct entry of the access password, the system asserts the busy signal line, indicating that the SCSI bus is busy. Both internal and external devices are prohibited from accessing the SCSI bus while the busy signal line is asserted.

22 Claims, 3 Drawing Sheets

DATA PROCESSING SYSTEM AND METHOD FOR PROHIBITING ACCESS TO A SCSI BUS

BACKGROUND OF THE INVENTION

1. Field of the Invention

The present invention relates in general to data processing systems and, in particular, to a data processing system and method for prohibiting access to a SCSI bus. Still more particularly, the present invention relates to a data processing system and method for prohibiting external devices from accessing a SCSI bus prior to a correct entry of an access password.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), and a pointing device such as a mouse. One of the distinguishing characteristics of these systems is the use of a motherboard or system planar to electrically connect these components together. Examples of such personal computer systems are IBM's PC 300 series, Aptiva series, and Intellistation series.

Storage systems may be coupled to computer systems utilizing a variety of communication protocols or standards. One such standard is the small computer system interface, or SCSI. The SCSI standard defines a particular command set which provides an interface between a computer system and peripherals.

A SCSI bus carries data and control signal lines from a SCSI controller to and from the SCSI devices coupled to the bus. One SCSI bus signal line is a BUSY signal line. The BUSY signal line is utilized to indicate when the SCSI bus is busy. When the BUSY signal line is asserted, neither devices nor controllers may utilize or gain control of the SCSI bus. When the BUSY signal line is asserted, it is held at a logical LOW to indicate that the line is busy. When the BUSY signal line is de-asserted, the line is pulled high to indicated that the line is not busy. Any device may assert the BUSY signal line. Only the system planar, however, may de-assert the line.

A SCSI bus, internal within a computer system, may be accessed both by the computer system's internal devices and processor, as well as external devices including an external processor utilizing an external connector. The internal SCSI bus devices are not secure in a system having an external connector. As long as the internal SCSI bus devices are receiving power, they may be accessed by an external controller utilizing the external connector. The external controller could access, change, or destroy data stored within the internal devices.

Therefore a need exists for a data processing system and method for prohibiting devices from accessing a SCSI bus prior to an entry of a valid password.

SUMMARY OF THE INVENTION

A data processing system and method are disclosed for prohibiting access to a SCSI bus prior to a correct entry of an access password. The system includes a plurality of internal SCSI bus devices coupled to the SCSI bus. The system also includes an external SCSI connector for coupling external SCSI devices to the SCSI bus. The access password is established and stored within the system. The plurality of internal SCSI bus devices and the external devices are prohibited from accessing the SCSI bus prior to a correct entry of the access password. The SCSI bus includes a busy signal line. Prior to a correct entry of the access password, the system asserts the busy signal line, indicating that the SCSI bus is busy. Both internal and external devices are prohibited from accessing the SCSI bus while the busy signal line is asserted.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
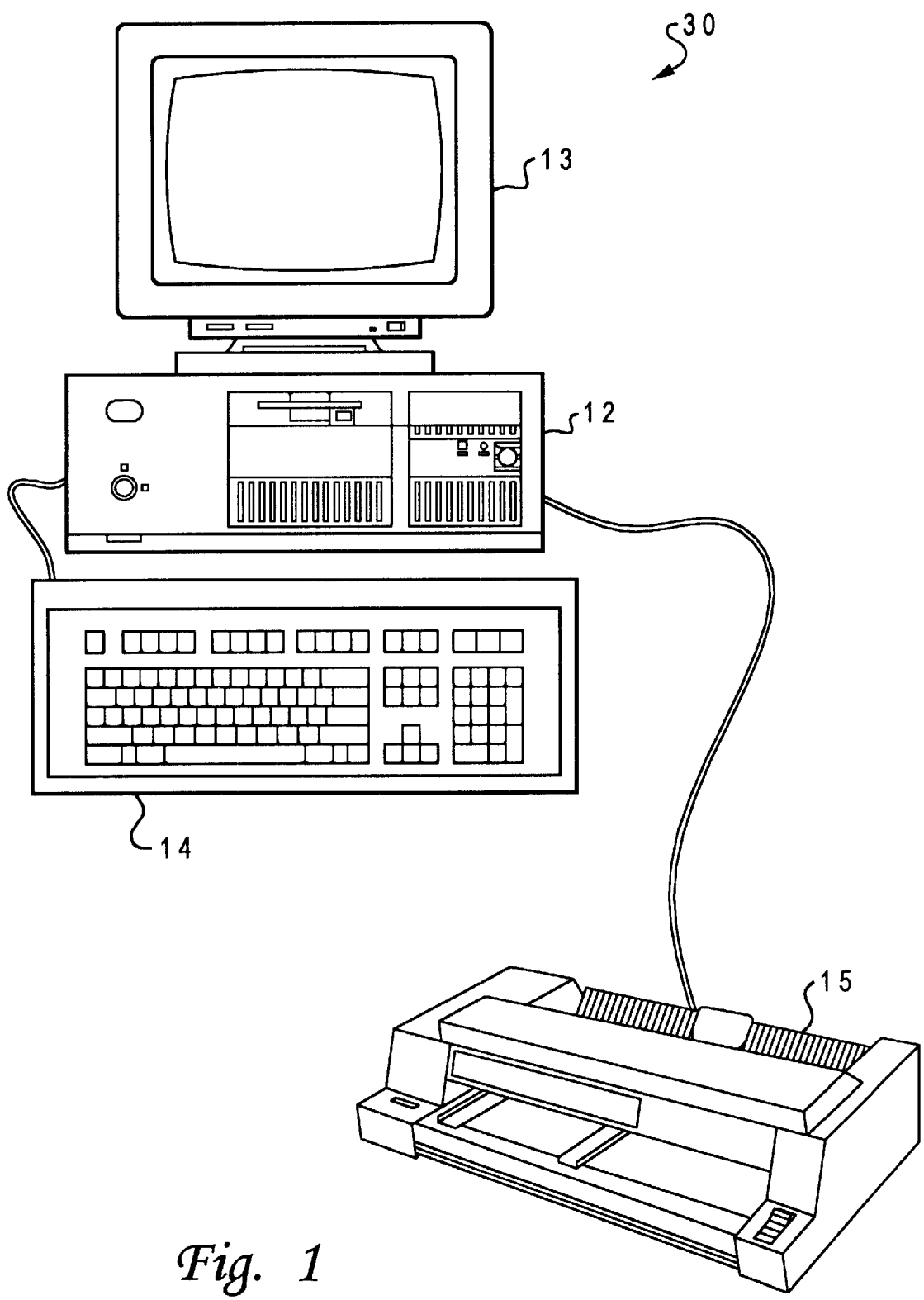
FIG. 1 illustrates a pictorial representation of a data processing system in accordance with the method and system of the present invention.
Figure 2:
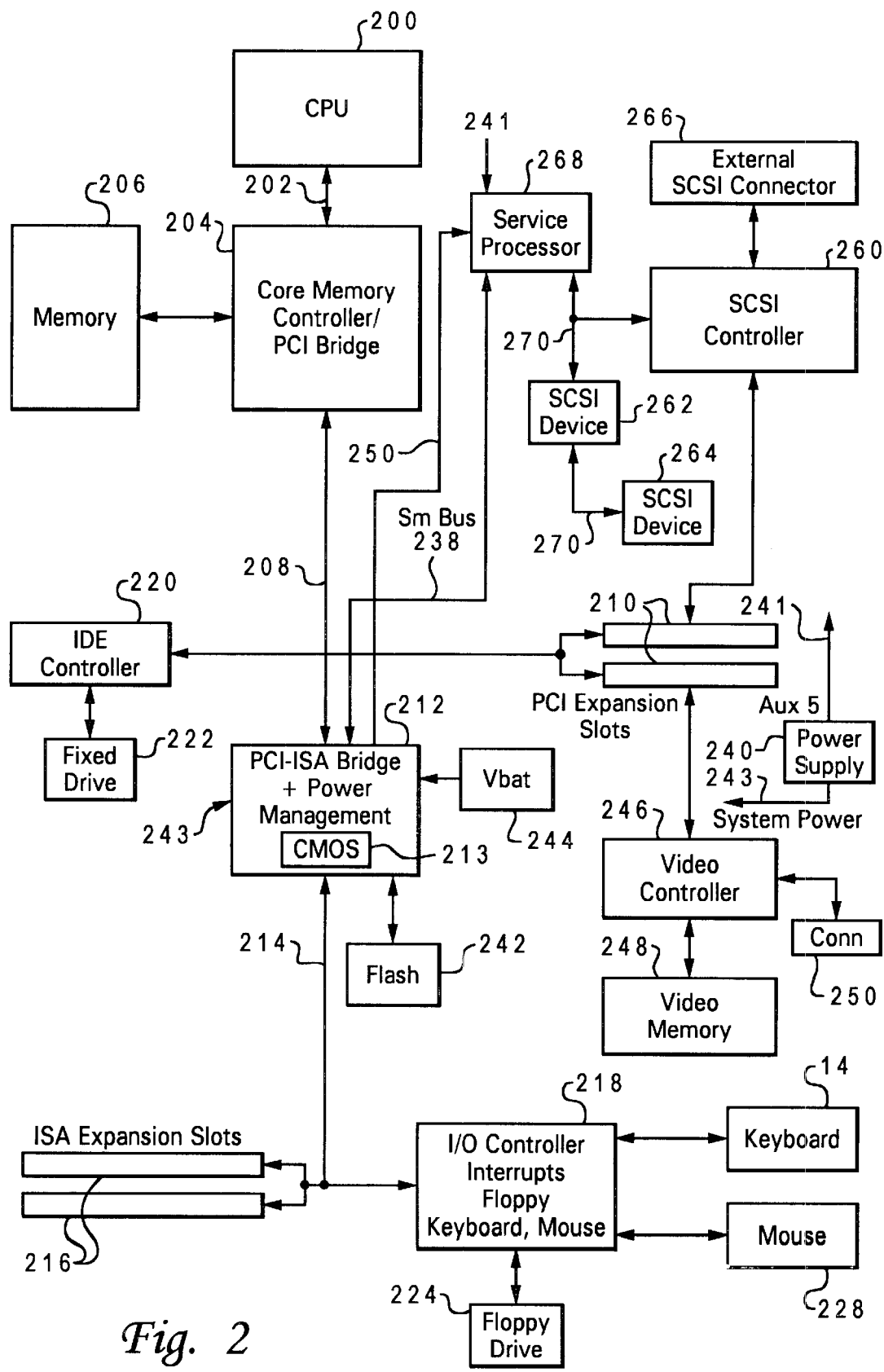
FIG. 2 depicts a more detailed pictorial representation of the data processing system of FIG. 1 in accordance with the method and system of the present invention.
Figure 3:
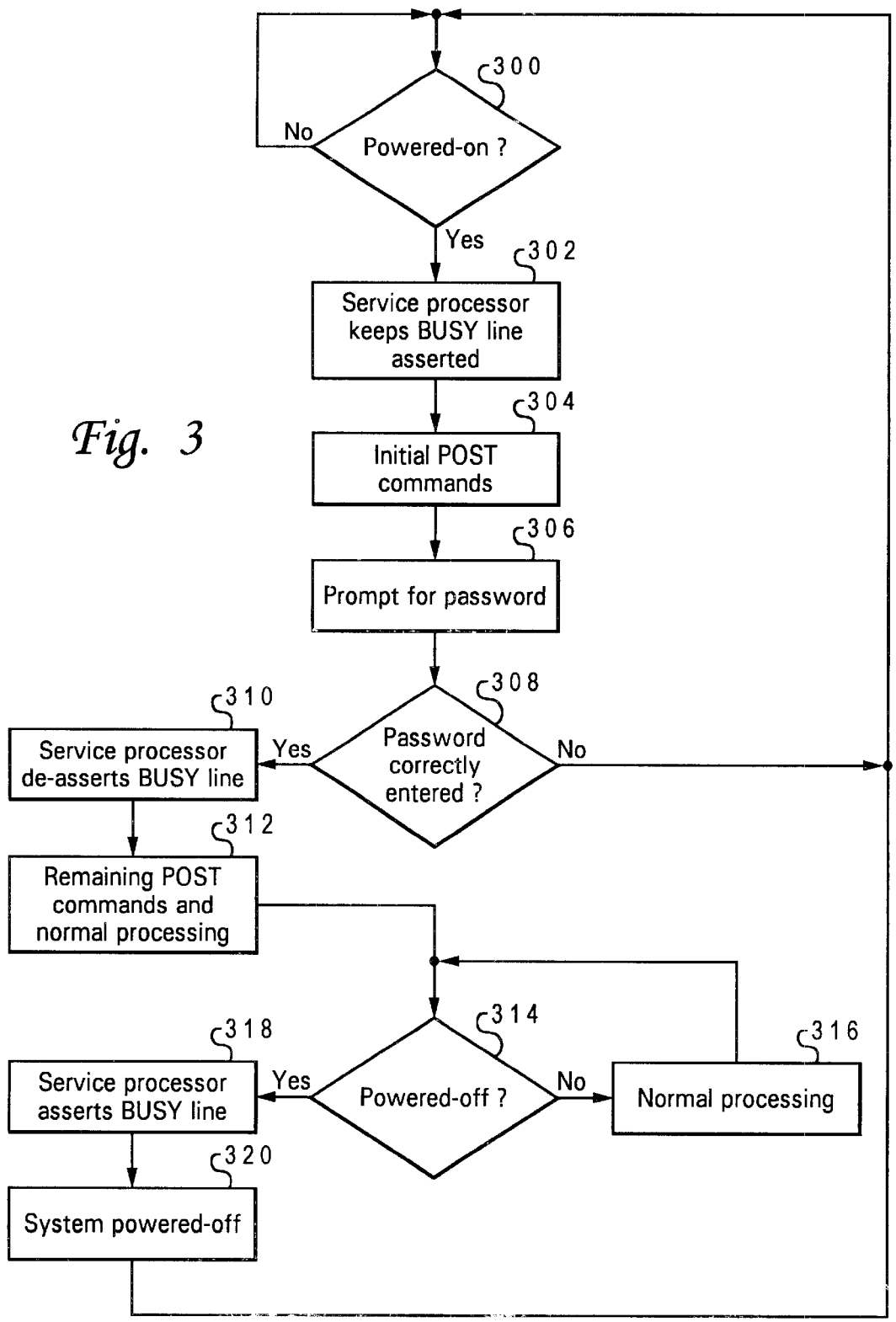
FIG. 3 illustrates a high level flow chart which depicts a computer system prohibiting both internal and external devices from accessing a SCSI bus prior to an entry of a valid password in accordance with the method and system of the present invention.

A preferred embodiment of the present invention and its advantages are better understood by referring to FIGS. 1–3 of the drawings, like numerals being used for like and corresponding parts of the accompanying drawings.

The present invention is a method and system for prohibiting access to a SCSI bus. The system includes internal SCSI devices and a SCSI controller coupled to the SCSI bus. The SCSI bus is also coupled to an external SCSI connector.

The SCSI bus includes a BUSY signal line for indicating when the SCSI bus may be accessed. When the BUSY signal line is asserted, neither internal nor external devices may access the bus. When the BUSY signal line is de-asserted, the bus is free and may be accessed by either internal or external devices.

An access password is established and stored within the computer system. Prior to a user correctly entering the access password, access to the SCSI bus is prohibited by asserting the BUSY signal line. When the access password is correctly entered, the BUSY signal line is de-asserted, thus enabling access to the SCSI bus.

Either a service processor or a general purpose input/output device is utilized to assert or de-assert the BUSY signal line. The processor or device is coupled to the SCSI bus, and receives full time auxiliary power. In this manner, the processor or device is capable of continuing to assert the BUSY signal line while the computer system is powered-off.

FIG. 1 illustrates a pictorial representation of a data processing system in accordance with the method and system of the present invention. Computer system 30 includes a computer 12, a monitor 13, a keyboard 14, and a printer or plotter 15. Computer system 30 may be implemented utilizing any commercially available computer system which has been suitably programmed and which has been modified as described below.

FIG. 2 depicts a more detailed pictorial representation of the data processing system of FIG. 1 in accordance with the method and system of the present invention. Computer 12 includes a planar (also commonly called a motherboard or system board) which is mounted within computer 12 and provides a means for mounting and electrically interconnecting various components of computer 12 including a central processing unit (CPU) 200, system memory 206, and accessory cards or boards as is well known in the art.

CPU 200, is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 212 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is: supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 14, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 12 includes a video controller 246 which may, for example, be plugged into one of PCI expansion slots 210. Video controller 246 is connected to video memory 248. The image in video memory 248 is read by controller 246 and displayed on monitor 13 which is connected to computer 12 through connector 250.

Computer system 12 includes a power supply 240 which supplies full normal system power 243, and has an auxiliary power main AUX 5 241 which supplies full time power to the power management logic 212, and to a service processor 268. Those skilled in the art will recognize that a general purpose input/output signal 250 from bridge 212 may be utilized instead of service processor 268.

A SCSI controller 260 is included within computer 12 and is coupled to a plurality of devices conforming to the SCSI standard, such as SCSI devices 262 and 264, utilizing a bus 270 which conforms to the SCSI standard. SCSI devices 262 and 264 may include any combination of SCSI devices, such as SCSI, disk drives, tape drives, or other types of SCSI devices. SCSI controller 260 is also coupled to an external SCSI connector 266. External devices, such as an external SCSI controller, may be coupled to SCSI controller, and thus SCSI bus 270, utilizing external SCSI connector 266.

Service processor 238 is also coupled to SCSI controller 260 utilizing SCSI bus 270, and is coupled to PCI/ISA bridge 212 utilizing a system management bus 238. System management bus 238 is a two-wire, low speed, serial bus used to interconnect management and monitoring devices. Those skilled in the art will recognize that service processor 268 may be coupled to another bus within the planar.

Service processor 268 is capable of asserting or de-asserting a BUSY signal included within SCSI bus 270. Service processor 268 keeps the BUSY signal line asserted until service processor 268 receives an indication via SM bus 238 from PCI/ISA bridge 212 that a valid password has been entered. Upon the entry of the valid password, service processor 270 will then de-assert the BUSY signal line. Service processor 268 receives full-time, auxiliary power 241 so that service processor 268 is capable of keeping the BUSY signal line asserted while computer 12 is powered-off.

FIG. 3 illustrates a high level flow chart which depicts a computer system prohibiting both internal and external devices from accessing a SCSI bus prior to an entry of a valid password in accordance with the method and system of the present invention. The process starts as illustrated at block 300 which depicts a determination of whether or not the computer system has been powered-on. If a determination is made that the computer has not been powered-on, the process passes back to block 300. If a determination is made that the computer has been powered-on, the process passes to block 302 which depicts a service processor included within the computer system keeping a BUSY signal line within the SCSI bus asserted. When the BUSY signal line is asserted, no device may utilize the SCSI bus. When the BUSY signal line is de-asserted, the bus is free and may be utilized in accordance with the SCSI standard by internal and external devices.

Next, block 304 illustrates the computer system processing initial POST commands. Thereafter, block 306 depicts the computer system prompting for the entry of a valid password. The password may be any type of password, such as a power-on password, privileged access password, or other password. The process then passes to block 308 which illustrates a determination of whether or not a valid password was correctly entered. If a determination is made that the password was not correctly entered, the process passes back to block 300.

Referring again to block 308, if a determination is made that the password was correctly entered, the process passes to block 310 which depicts the service processor de-asserting the SCSI bus BUSY signal line. Next, block 312 illustrates the computer system executing the remaining POST commands. The computer system then continues with normal processing. The process passes to block 314 which depicts a determination of whether or not the computer system has been powered-off. If a determination is made that the computer system has not been powered-off, the process passes to block 316 which illustrates the continuation of normal processing. The process then passes back to block 314.

Referring again to block 314, if a determination is made that the computer system has been powered-off, the process passes to block 318 which depicts the service processor asserting the BUSY signal line. The process then passes to block 320 which illustrates the system being powered-off. The process then passes back to block 300.

While a preferred embodiment has been particularly shown and described, it will be understood by those skilled in the art that various changes in form and detail may be made therein without departing from the spirit and scope of the present invention.

What is claimed is:

1. A method implemented in a data processing system for prohibiting access to a SCSI bus prior to an entry of an access password, said data processing system including at least one SCSI device coupled to said SCSI bus and an external SCSI connector for coupling external SCSI devices to said SCSI bus, said method comprising the steps of:

establishing and storing said access password;

prohibiting access to said SCSI bus prior to the entry of said access password; and responsive to the entry of said correct access password, enabling access to said SCSI bus by a connected SCSI device according to established SCSI bus operational parameters.

2. The method according to claim 1, wherein said prohibiting step includes asserting a busy signal line that is utilized to indicate when said SCSI bus cannot be accessed by a connected SCSI device, said busy signal line also being utilized during normal SCSI bus operation to indicate when said SCSI bus is in use by a device, wherein said SCSI bus is incapable of being utilized by other devices when said busy signal line is asserted.

3. The method according to claim 2, wherein said asserting step asserts said busy signal line prior to the entry of said access password.

4. The method according to claim 2, wherein said asserting of said busy signal line occurs during a power down of said data processing system so that said SCSI bus is not accessible to external devices during power off of said data processing system, and wherein said method further comprises the step of prompting for entry of said correct access password during a boot process of said data processing system.

5. The method according to claim 2, wherein said enabling step comprises de-asserting said busy signal line so that access to said SCSI bus is permitted, wherein a device may access said SCSI bus when said SCSI bus is free.

6. The method according to claim 2, wherein said data processing system further comprises a service processor coupled to said SCSI bus for asserting and de-asserting said busy signal line.

7. The method according to claim 6, further comprising the step of providing auxiliary power to said service processor for constantly powering said service processor while said system is powered-off, wherein said service processor is capable of asserting or de-asserting said busy signal line while said system is powered-off.

8. The method according to claim 5, further comprising the step of providing a signal from a general purpose input/output (I/O) device coupled to said SCSI bus for asserting and de-asserting said busy signal line.

9. A data processing system for prohibiting access to a SCSI bus prior to an entry of an access password, comprising:

at least one SCSI device coupled to said SCSI bus;

an external SCSI connector for coupling external SCSI devices to said SCSI bus;

means for establishing and storing said access password;

means for prohibiting access to said SCSI bus prior to an entry of said access password; and responsive to the entry of said access password, providing access to said SCSI bus by one of said at least one SCSI device according to SCSI operational standards.

10. The data processing system according to claim 9, wherein said SCSI bus includes a busy signal line, which prevents access to said SCSI bus when it is asserted, wherein said busy signal line further prevents utilization of said SCSI bus by other devices when said busy signal line indicates that said SCSI bus is busy.

11. The data processing system according to claim 10, wherein said means for prohibiting access to said SCSI bus includes means for asserting said busy signal line prior to said correct entry of said access password.

12. The data processing system according to claim 11, further comprising:

means for automatically asserting said busy signal line during a power down of said data processing system; and means for prompting for entry of said access password during execution of a boot process of said data processing system.

13. The data processing system according to claim 12, further comprising means for de-asserting said busy signal line indicating that said SCSI bus is free in response to a correct entry of said access password, wherein said at least one SCSI device may access said SCSI bus.

14. The data processing system according to claim 13, wherein said means for prohibiting access includes a service processor coupled to said SCSI bus and which implements said means for asserting and de-asserting said busy signal line.

15. The data processing system according to claim 14, further comprising a power supply for providing auxiliary power to said service processor for constantly powering said service processor while said data processing system is powered-off, wherein said service processor is capable of asserting or de-asserting said busy signal line while said data processing system is powered-off.

16. The data processing system according to claim 13, wherein said means for prohibiting includes a general purpose input/output device coupled to said SCSI bus which issues a signal for asserting and de-asserting said busy signal line.

17. A data processing data processing system comprising:

an SCSI bus having a SCSI controller and a busy signal line for indicating when said SCSI bus is in use by a device and may not be utilized other devices;

at least one SCSI bus device coupled to said SCSI bus, and an external SCSI connector for coupling external SCSI devices to said SCSI bus;

a service processor coupled to said SCSI bus for asserting and de-asserting said busy signal line;

program logic for establishing and storing an access password within said data processing system, wherein said access password is required prior to allowing access to said SCSI bus by a device;

program logic for prompting for entry of said access password in response to said data processing system initiating a boot process;

means, prior to a correct entry of said access password, wherein said service processor asserts said busy signal line preventing access to said SCSI bus, wherein said at least one SCSI bus devices and said external devices are prohibited from accessing said SCSI bus while said busy signal line is asserted;

means, in response to a correct entry of said access password, wherein said service processor permits access to said SCSI bus by de-asserting said busy signal line indicating that said SCSI bus is free, wherein a device may access said SCSI bus; and a power supply for providing auxiliary power to said service processor for constantly powering said service processor while said data processing system is powered-off, wherein said service processor is capable of asserting or de-asserting said busy signal line while said data processing system is powered-off.

18. The data processing system according to claim 16, wherein said general purpose I/O device comprises a PCI/ISA bridge.

19. The data processing system of claim 9, wherein said means for prohibiting access includes a service processor coupled to said SCSI bus.

20. The data processing system of claim 19, wherein said service processor is coupled to said SCSI controller via said SCSI bus and to said PCI/ISA bridge via a data processing system management (SM) bus, utilized to interconnect management and monitoring devices.

21. The data processing system of claim 20, wherein said SCSI bus includes a busy signal line and said service processor includes logic for asserting said busy signal line until an indication is received via said SM bus from PCI/ISA bridge that a valid password has been entered.

22. The data processing system of claim 21, further comprising an auxiliary power supply that provides power to said service processor even after said data processing system is powered off, and wherein said service processor maintains said busy signal line asserted while said data processing system is powered off to prevent external components from accessing said SCSI bus.

* * * * *